(12) United States Patent
Bescherer (10) Patent No.: US 6,539,892 B1
(45) Date of Patent: Apr. 1, 2003

(54) GUARD FOR BIRD FEEDERS

(75) Inventor: Robert E. Bescherer, Bristol, RI (US)

(73) Assignee: Aspects, Inc., Warren, RI (US)

( * ) Notice: Subject to any disclaimer, the term of this patent is extended or adjusted under 35 U.S.C. 154(b) by 0 days.

(21) Appl. No.: 09/721,127

(22) Filed: Nov. 22, 2000

Related U.S. Application Data (60) Provisional application No. 60/168,047, filed on Nov. 30, 1999.

(51) Int. Cl.$^7$ .............................................. A01K 61/02
(52) U.S. Cl. ..................................................... 119/52.1
(58) Field of Search ............................... 119/52.1, 52.2, 119/459, 52.3, 467, 52.4, 469, 57.8, 470, 57.9

(56) References Cited

U.S. PATENT DOCUMENTS

| | | | |
|---|---|---|---|
| 2,591,459 A | * | 4/1952 | Meany |
| 3,568,641 A | | 3/1971 | Kilham ........................ 119/51 |
| 4,188,913 A | * | 2/1980 | Earl et al. |
| D262,917 S | | 2/1982 | Kilham ........................ D30/14 |
| 4,896,628 A | * | 1/1990 | Kadunce .................... 119/52.2 |
| 4,996,947 A | | 3/1991 | Petrides ..................... 119/57.9 |
| 5,189,984 A | * | 3/1993 | Smith ......................... 119/52.2 |
| 5,452,682 A | | 9/1995 | Bescherer et al. ......... 119/57.8 |
| 5,634,429 A | * | 6/1997 | Loomis et al. ............. 119/52.2 |

* cited by examiner

*Primary Examiner*—Thomas Price
(74) *Attorney, Agent, or Firm*—Barlow, Josephs & Holmes, Ltd.

(57) ABSTRACT

A protective guard for a bird feeder is provided. The protective guard includes a substantially dome-shaped main body with a concave inner side, a convex outer side and an apex region. The main body includes a wire hanger receiving slot through the apex region of the main body. A circular wall downwardly depends from the concave inner side of the main body. The circular wall is located to surround the wire hanger receiving slot and is dimensioned to have a diameter slightly larger than the diameter of a top cap of a bird feeder. The guard may be readily placed over and installed on a bird feeder by inserting a wire hanger of the bird feeder through the wire hanger receiving slot with the concave inner side of the main body resting on the upper surface of the top cap of the bird feeder thereby retrofitting the protective guard thereto. In addition, the guard may be connected to the bottom of a post mounted bird feeder to provide a squirrel baffle.

8 Claims, 8 Drawing Sheets

GUARD FOR BIRD FEEDERS

This application claims the benefit of Provisional Application No. 60/168,047 filed Nov. 30, 1999.

BACKGROUND OF THE INVENTION

The present invention relates generally to guards for bird feeders to act as a deterrent to minimize the intrusion of unwanted animals, such as squirrels, from accessing and feeding from the bird feeder. In addition, the present invention relates to a structure for protecting the feed from weather, such as rain and snow. More specifically, the present invention relates to an easily installable guard for bird feeders to keep unwanted animals from accessing the bird feeder and to protect it from the weather.

Bird feeding has become a popular and fun hobby. One of the most practical and popular types of wild bird feeders is the tubular bird feeder. This common and popular style of feeder typically has a clear plastic tube between 2½ and 3 inches in diameter and between 10 and 18 inches in length. The tubular feeder includes a plastic or metal top cap and a plastic or metal base. A number of feed stations with perches, typically ranging from 2 to 8 depending on the size of the feeder, emanate outwardly from the tubular body of the feeder. A tubular bird feeder design is quite desirable because all birds can be easily seen when feeding due to the lack of a "blind spot."

All bird feeders, even the tubular feeder discussed above, suffer from various problems. First, bird feed is susceptible to spoilage when exposed to weather, particularly rain and snow. If the bird feed gets wet, it becomes soggy and undesirable to feeding birds. Further, soggy bird feed is susceptible to clogging. Eventually, it will not dispense properly rending the feeder useless.

In the field of bird feeders, various problems arise concerning access to the feeder by unwanted animals, such as squirrels. There is an unavoidable problem associated with the installation of a bird feeder in that unwanted animals may attempt to gain access to the bird feeder to eat the feed therein. These animals have little trouble accessing the feed within the feeder, regardless of how it is hung.

To combat the affect of weather on the bird feeder and to combat the animal nuisance, various attempts have been made in the prior art to address these problems. For example, it is common to hang the feeder under a plastic dome and/or house the feeder within a wire mesh cage that has apertures small enough to allow bird access but to prevent access by larger animals, such as squirrels and pigeons. However, these prior art domes and wire mesh cages are typically custom built for the particular bird feeder design at hand and are difficult and cumbersome to install.

Therefore, there is a demand for a guard that helps protect a bird feeder from weather and invading animals. There is also a demand for a guard that may be easily retrofitted to preexisting bird feeders. It is also desirable for a bird feeder guard to be easily installable and removable without the need for any alteration to the preexisting bird feeder.

SUMMARY OF THE INVENTION

The present invention preserves the advantages of prior art guards for bird feeders. In addition, it provides new advantages not found in currently available guards for bird feeders, and overcomes many disadvantages of such currently available guards.

The invention is generally directed to a novel and unique protective guard for bird feeders. The protective guard includes a substantially dome-shaped main body with a concave inner side, a convex outer side and an apex region. The main body includes a wire hanger receiving slot through the apex region of the main body. A circular wall downwardly extends from the concave inner side of the main body. The circular wall is located to surround the wire hanger receiving slot and is dimensioned to have a diameter slightly larger than the diameter of a top cap of a bird feeder. The guard may be readily placed over and installed on a bird feeder by inserting a wire hanger of the bird feeder through the wire hanger receiving slot with the concave inner side of the main body resting on the upper convex surface of the top cap of the bird feeder thereby retrofitting the protective guard thereto.

The guard of the present invention may be installed over the top of a feeder to provide weather protection and animal invasion protection. For installation, the wire hanger or bail wire of the feeder is routed through a unique slot in the guard so that the guard, preferably in a dome shape, sits on the top cap of the feeder. Also, the guard may be installed on the bottom of the feeder to provide a squirrel baffle when the feeder is mounted on a post. For this installation, a post with a male threaded end is routed through an enlarged portion or center hole of the slot in the guard and is threaded into a female threaded hole in the bottom of the base of the bird feeder. A threaded collar is preferably used to retain the guard in place below the base of the bird feeder.

It is therefore an object of the present invention to provide a guard for a bird feeder that protects a bird feeder, such as one in a tubular configuration, against weather, such as rain and snow.

It is a further object of the present invention to provide a guard for a bird feeder that protects the bird feeder from invasion from animals, such as squirrels and pigeons.

It is another object of the present invention to provide a guard for a bird feeder that may also be connected to the bottom of a bird feeder to provide a squirrel baffle when the feeder is mounted on a post.

A further object of the present invention is to provide a guard for a bird feeder that can be mounted either to the top or bottom of a feeder.

Yet a further object of the present invention is to provide a guard for a bird feeder that can be easily removed for quick access to the feeder for refilling.

BRIEF DESCRIPTION OF THE DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

DETAILED DESCRIPTION OF THE PREFERRED EMBODIMENT

Figure 1:
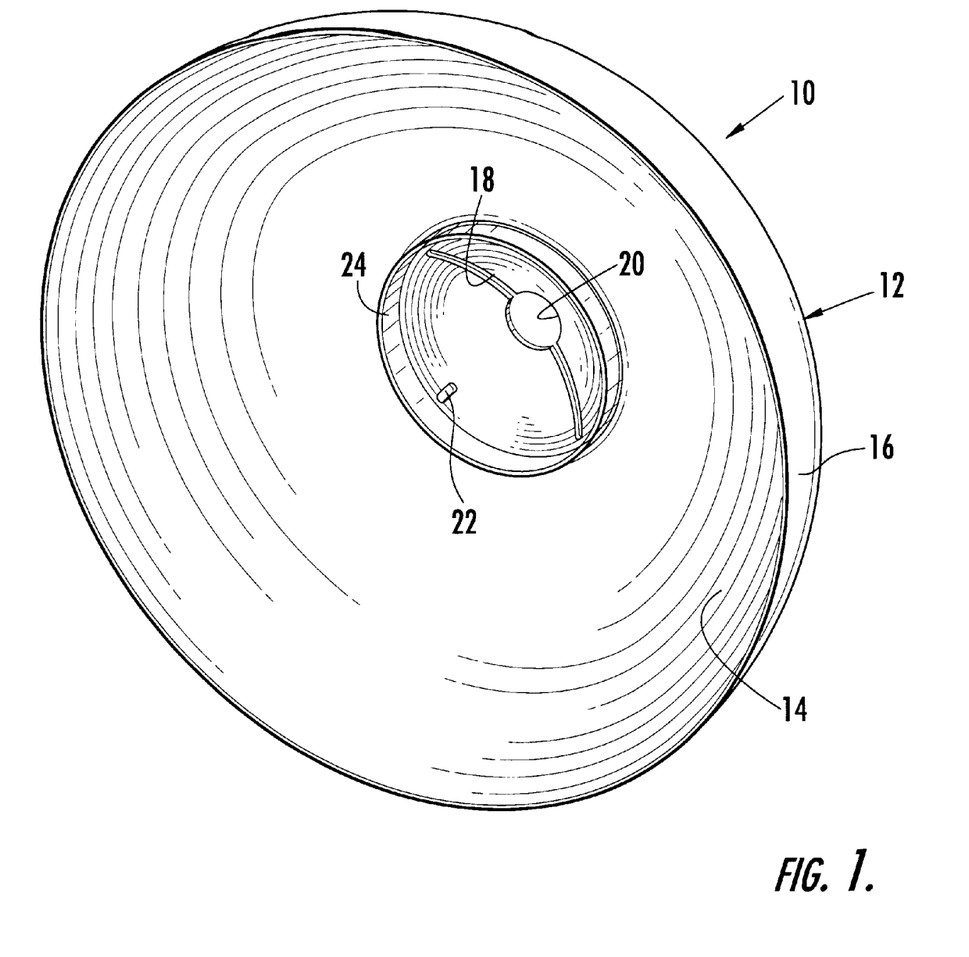
FIG. 1 is a bottom perspective view of the squirrel and weather guard of the present invention.

Referring first to FIG. 1, a bottom perspective view of the guard 10 for bird feeders of the present invention. The main body 12 of the guard 10 is preferably configured in a dome shape for improved protection as will be described in detail below. However, other suitable configurations, such as pyramidal and frusto-conical designs, may also be employed. Still referring to FIG. 1, the guard 10 of the present invention includes an concave inner side 14 and an convex outer side 16. A slot 18 is provided in the main body 12 that includes an enlarged central region 20 for receipt of a post when connected to the bottom of a feeder as squirrel baffle, as will be described below. Further, a pair of notches 22, which acts as female keys, are provided of which one notch 22 is visible in FIG. 1. As will be described in detail below, these notches 22 are employed when connecting the guard 10 to the bottom of a bird feeder for use as a squirrel baffle. A downwardly depending circular wall 24 is provided to stabilize the guard 10 when installed on the top of a bird feeder and to center the guard 10 thereon.

The guard 10 of the present invention is preferably made of plastic for ease of construction but may be of other materials, such as metal. It may be made of a clear transparent material or of an opaque material. For ease of illustration and clarity, the guard 10 of the present invention is shown as opaque.

Figure 2:
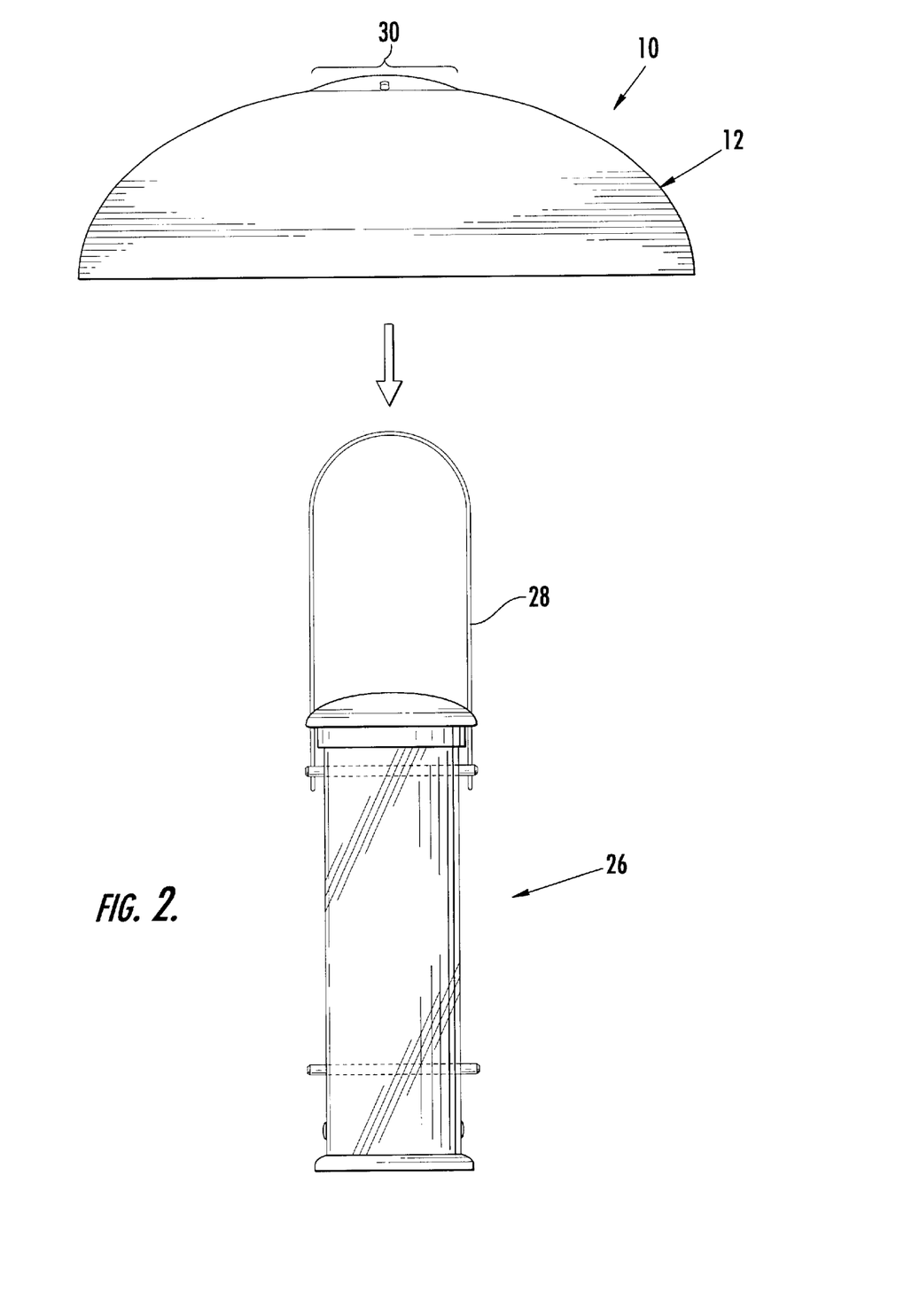
FIG. 2 is a side elevational view of the squirrel and weather guard of FIG. 1 in the process of being installed on a bird feeder.
Figure 3:
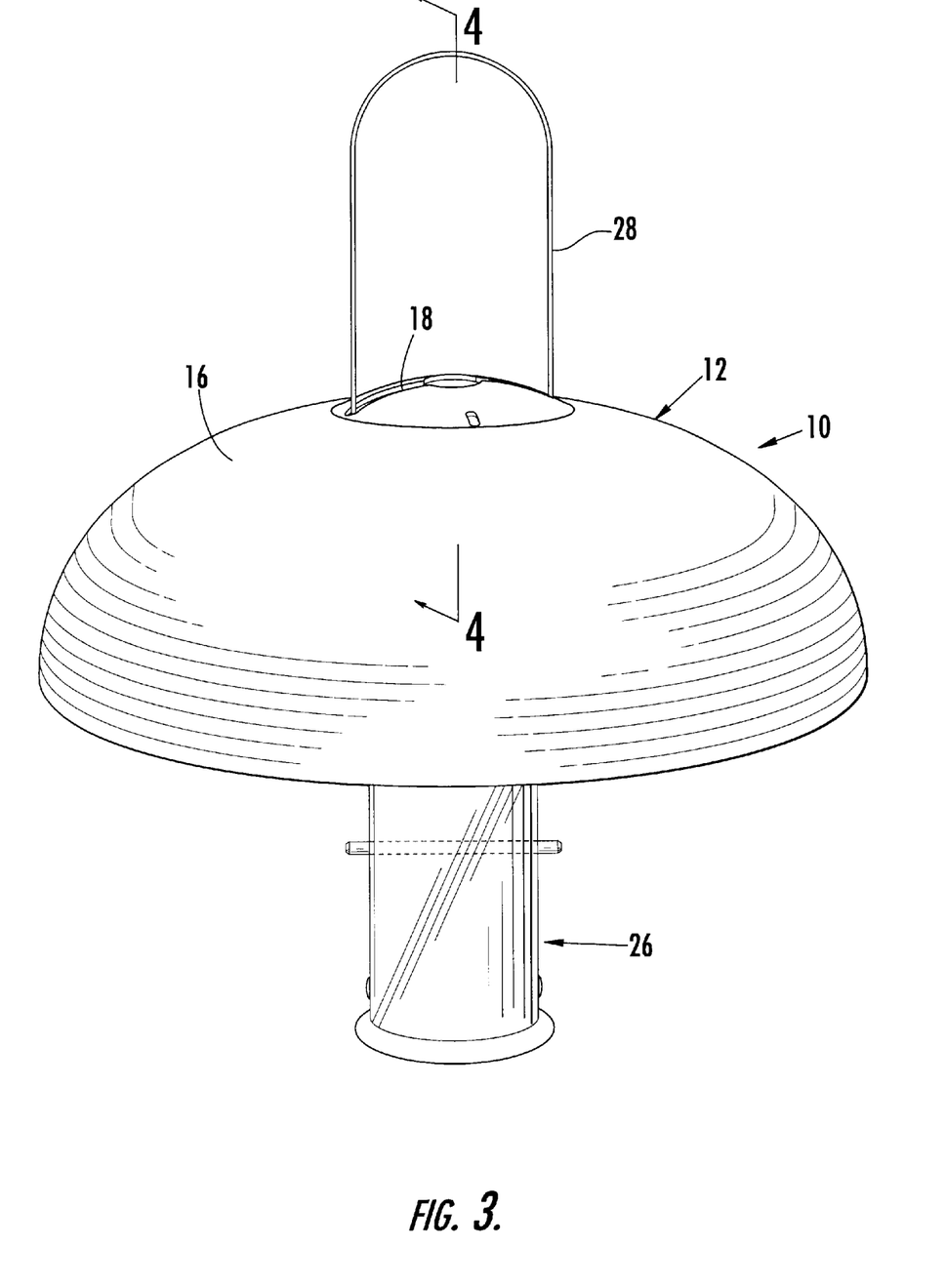
FIG. 3 is a top perspective view of the squirrel and weather guard of FIG. 1 installed on a bird feeder.

Referring now to FIG. 2, a side elevational view of the guard 10 of the present invention installed on a bird feeder 26 is shown. The figures illustrate the guard 10 of the present invention being installed on a tubular bird feeder 26. It should be understood that the guard 10 of the present invention can be installed on a wide variety of different feeders to provide protection. The guard 10 of the present invention is shown installed on a tubular feeder 26 by way of example of the use and installation of the guard 10 of the present invention. Still referring to FIG. 2, use of the guard 10 as a top protection device for a bird feeder 26. For installation, the guard 10 is positioned directly over a feeder 26 and is moved downwardly, as indicated by the arrow, onto the feeder 26. As can be seen in FIG. 3, the wire hanger 28 is routed through the slot 18 in the apex region 30 of the main body 12 of the guard 10. The slot is preferably dimensioned slightly larger than the cross-sectional area of the wire hanger to accommodate an extended wire hanger of a tubular feeder. As can be understood, the slot dimensions can be easily modified to accommodate wire hangers of differing sizes and configurations. As a result, the wire hanger 28 freely extends above the top convex side 16 of the main body 12 to enable customary hanging from a support, such as a tree limb (not shown).

Figure 4:
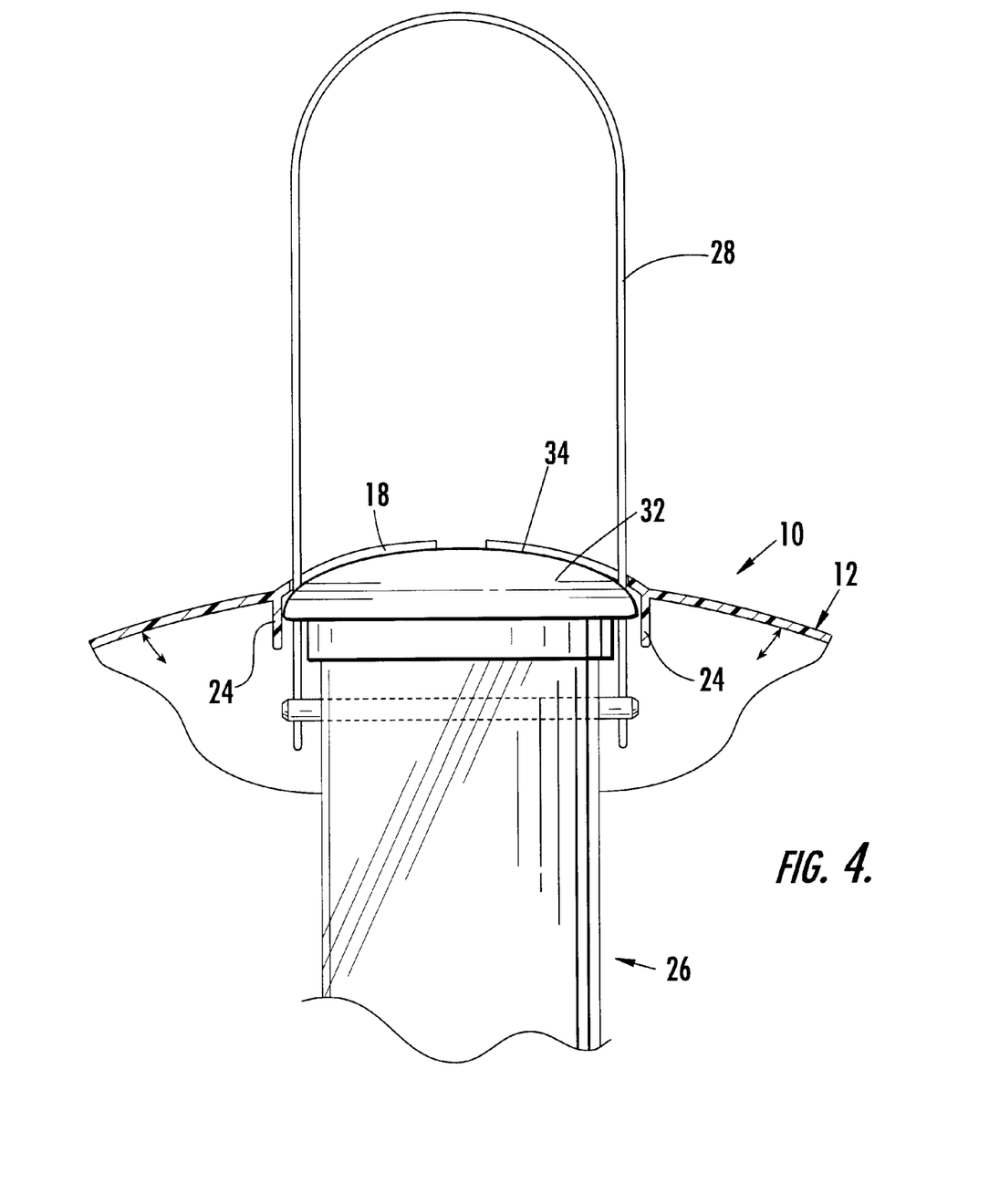
FIG. 4 is a cross-section view through the line 4—4 of FIG. 3.
Figure 5:
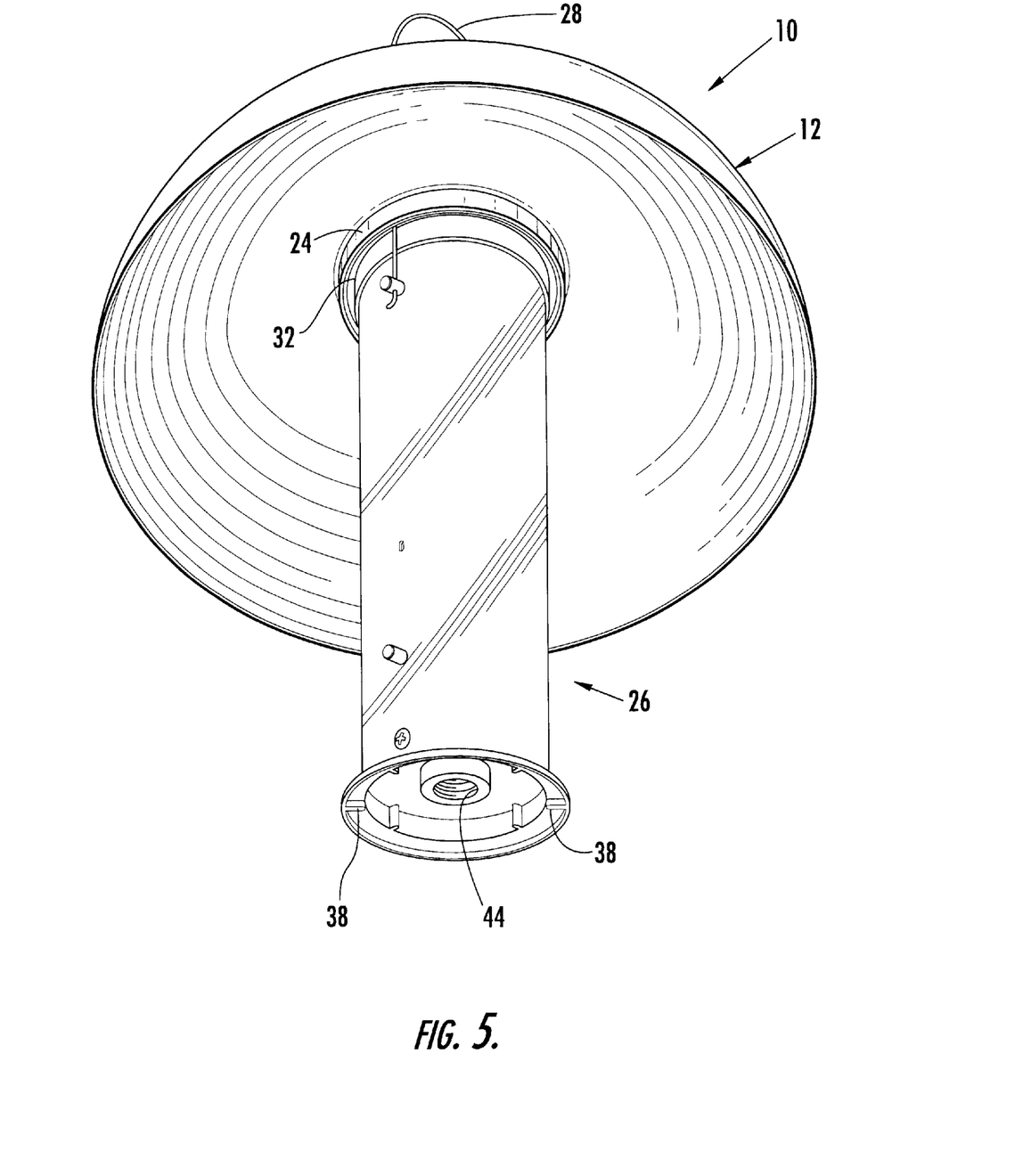
FIG. 5 is a bottom perspective view of the squirrel and weather guard of FIG. 1 installed on a bird feeder.

In FIGS. 4 and 5, details regarding the communication of the guard 10 of the present invention and the bird feeder 26 is shown. The main body 12 of the guard 10 sits on the upper side 34 of the top cap 32 of the bird feeder 26 with the wire hanger 28 extending thereabove and through the slot 18. The circular downwardly depending wall 24, which preferably has a diameter slightly larger than the outer diameter of the top cap 32, completely surrounds the outer periphery of the top cap 32. As a result, the guard 10 rests directly on the top of a bird feeder 26 with the bird feeder 26 closely nested within the circular wall 24. The downwardly depending wall 24 secures the guard 10 in place when the bird feeder 26 is moved about, particularly when a squirrel lands on the top convex surface 16 of the guard 10. When there is weight placed on the guard 10, the circular wall 24 prevents the entire guard 10 from rocking or tilting significantly, as shown by the arrows, to ensure that the guard 10 stays in place. Further, the circular wall 24 ensures that the guard 10 is centered at all times on the feeder 26 to provide complete protection of the bird feeder 26 from weather and animal invasion.

Figure 6:
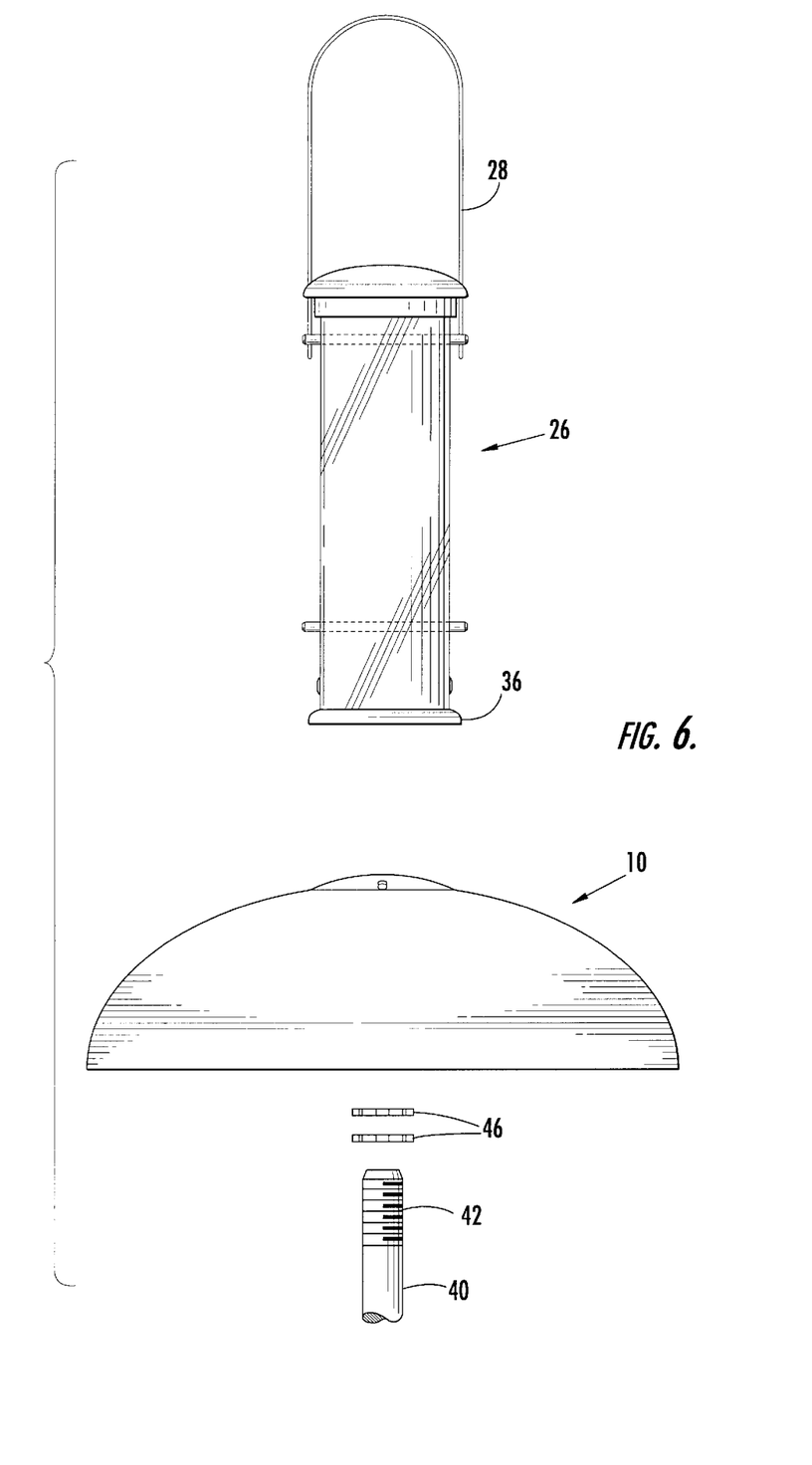
FIG. 6 is an exploded side elevational view of the squirrel and weather guard of FIG. 1 installed as a baffle for a post mounting of the bird feeder.
Figure 7:
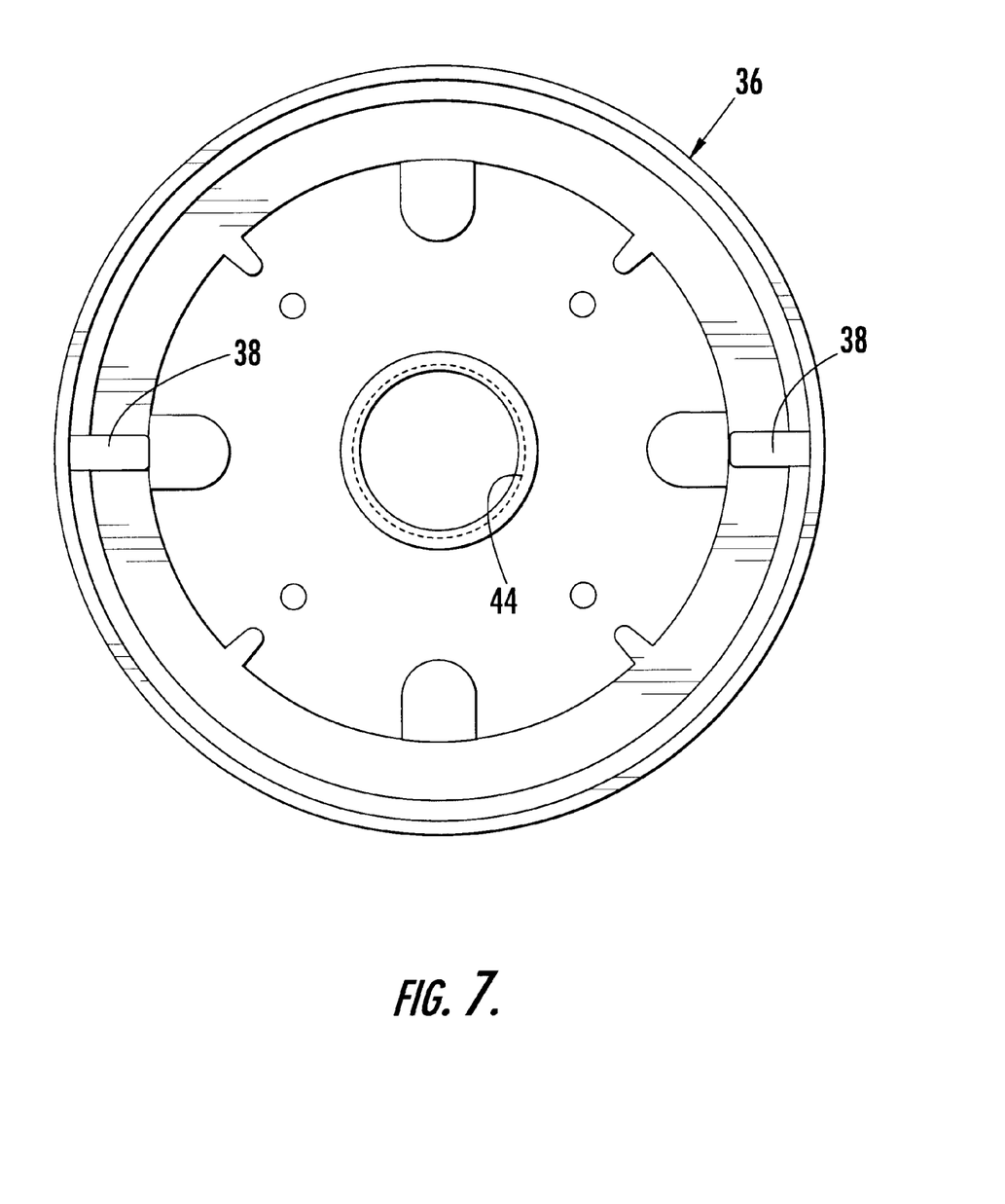
FIG. 7 is a bottom view of a bird feeder in accordance with the present invention.
Figure 8:
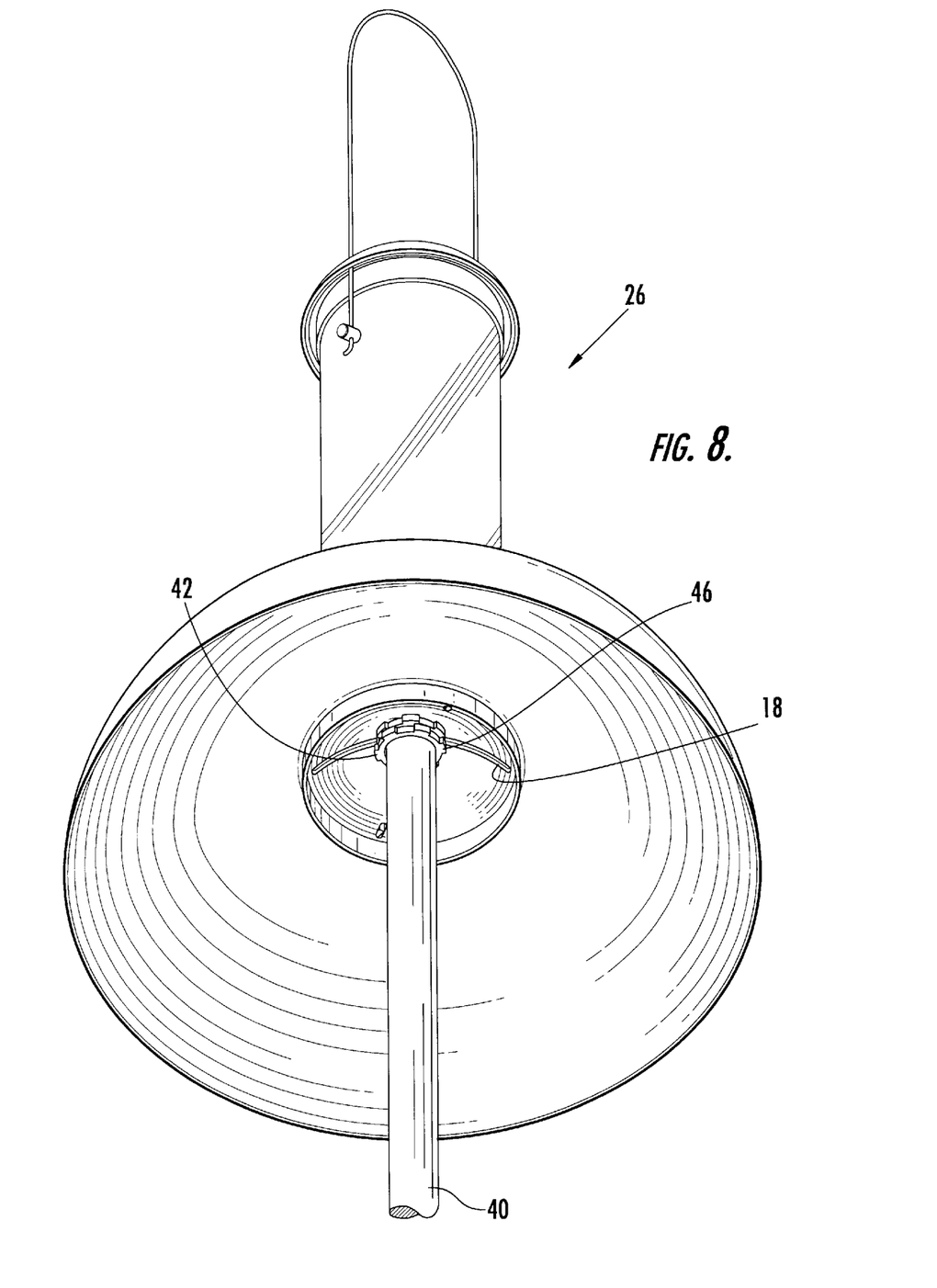
FIG. 8 is a bottom perspective view of the squirrel and weather guard of FIG. 1 installed as a baffle for a post mounting of the bird feeder.

Referring now to FIGS. 6–8, use of the guard 10 of the present invention as a squirrel baffle for a post-mounted bird feeder 26 is shown. FIG. 6 illustrates an exploded side elevational view of the guard 10 of the present invention installed on the bottom of the base 36 of the bird feeder 26 while FIG. 7 shows the bottom of the base 36 of the bird feeder 26. FIG. 8 illustrates a bottom perspective view of the guard 10 of the present invention fully installed on the bottom of the bird feeder 26 as a squirrel baffle.

The guard 10 is mated up with the bottom of the base 36 of the bird feeder 26, namely, the apex portion 30 of the main body 12 of the guard 10 is placed underneath the base 36 of the bird feeder 26. The base 36 of the bird feeder 26 and its bottom configuration in shown in detail in FIG. 7 and can also be seen in FIG. 5. Male keys 38, preferably 2 in number and on opposite sides from one another on the base 36, are provided to engage with female complementary keys or notches 22 provided through the apex region 30 of the main body 12 of the guard 10. Once the guard 10 is mated to the bottom of the base 36, a post 40, having male threads 42 thereon, is routed through the enlarged portion 20 of the slot in the apex region 30 (as best seen in FIG. 1) of the main body 12 into threaded communication with a female threaded bore 44 shown in FIGS. 5 and 7. As seen in FIG. 8, threaded retaining collars or nuts 46 are threaded on the post 40 below the guard 10 and tightened against the guard 10 to retain the guard 10 in communication with the bottom of the base 36 to provide a secure squirrel baffle.

The engagement of the male keys 38 on the bottom of the base 36 of the bird feeder 26 with the notches 22 in the guard 10 prevent the guard 10 from rotating undesirably which could loosen the retaining collars 46 and thereby compromise the protection of the guard 10. Further, the notches 22 provide clearance for the apex 30 of the main body 12, which is preferably dome-shaped, to fit against the bottom of the base 36 of the bird feeder 26. Separate notches 22 are provided in addition to the slot 18 to accommodate the larger and stronger male keys 38 to improve strength of the connection of the guard 10 to the bottom of the base 36 of the feeder 26. Alternatively, further the female notches 22 on the main body 12 of the guard 10 may be eliminated if the male keys 38 are made thinner whereby the male keys 38 may engage the slot 18 in the guard 10 directly.

In view of the foregoing, the guard 10 of the present invention provides an easily installable guard 10 that can be installed on a bird feeder 26 in two different configurations depending on the desired mounting of the bird feeder 26 itself. If the bird feeder 26 is hung from it wire hanger 28, the guard 10 is installed on the top of feeder 26. If the bird feeder 26 is post mounted, the guard 10 is installed to the bottom of the base 36 to provide a squirrel baffle. The guard 10 of the present invention is unique in its ability to easily install to the top of a bird feeder 26 and also have the ability to connect effectively to the bottom of a bird feeder 26 as a squirrel baffle.

Moreover, the present invention allows a guard to rest directly on the top of a bird feeder thus lowering the protection as much as possible to give maximum weather and animal protection. It further eliminates the need for metal eyes or other hardware as required in prior art protection devices. The snug fit of the guard 10 to a bird feeder 26 makes it almost impossible for a squirrel to tip the guard and gain access to the feed within the feeder. Also, if even further animal protection is required, wire mesh cage can be fitted to the feeder from below without affecting the guard 10 of the present invention.

It should be understood that the size, shape and configuration of the guard 10 of the present invention can be modified to accommodate bird feeders 26 of different sizes, lengths, and shapes. For example, the guard 10 may be larger and may extend downwardly in the vertical direction to accommodate larger tubular feeders. Further, the apex portion 30 of the main body 12 may be flat to obviate the need for notches 22. Although the guard of the present invention does not completely eliminate intrusion by squirrels and other animals, due to its unique configuration, the guard of the present invention does minimize the amount of bird seed than can be removed by the intruding animal.

It would be appreciated by those skilled in the art that various changes and modifications can be made to the illustrated embodiments without departing from the spirit of the present invention. All such modifications and changes are intended to be covered by the appended claims.

What is claimed is:

1. A protective guard in combination with a bird feeder, comprising:
    a bird feeder having top cap with an upper surface and diameter and a base with a lower side defining a post receiving female threaded aperture, a wire hanger connected to said bird feeder;
    a substantially dome-shaped main body having a concave inner side, a convex outer side and an apex region; said main body including a wire hanger receiving slot through said apex region of said main body; said wire hanger receiving slot including an enlarged, substantially circular opening defining a post pass-through bore;
    a male threaded support post; said male threaded post being receivable in said female threaded aperture; a threaded collar on said male threaded post;
    at least one base key positioned on said lower side of said base;
    at least one main body key positioned on said main body; said at least one base key being complementary to and matable with said at least one main body key thereby fixing rotation of said guard when connected to the lower side of said base as a baffle;
    whereby said guard may be readily placed over and installed on a bird feeder by inserting said wire hanger of said bird feeder through said wire hanger receiving slot with the concave inner side of said main body resting on the upper surface of the top cap of the bird feeder to retrofit a guard thereto; and whereby said guard may alternatively be readily secured to said base of the bird feeder as a baffle by routing said male threaded post through said post pass-through bore an into threaded engagement with said female threaded apertures of said base with said threaded collar retaining said guard in communication with said base of said bird feeder.

2. The protective guard of claim 1, further comprising:
    a circular wall downwardly depending from said concave inner side of said main body; said circular wall being located to surround said wire hanger receiving slot and dimensioned to have a diameter slightly larger than a diameter of a top cap of said bird feeder.

3. The protective guard of claim 2, wherein said main body and said circular wall are manufactured of plastic.

4. The protective guard of claim 1, wherein said main body is transparent.

5. A protective guard in combination with a bird feeder, comprising:
    a bird feeder having top cap with an upper surface and diameter and a base with a lower side defining a post receiving female threaded aperture, a wire hanger connected to said bird feeder;
    a substantially dome-shaped main body having a concave inner side, a convex outer side and an apex region; said main body including a wire hanger receiving slot through said apex region of said main body; said wire hanger receiving slot including an enlarged, substantially circular opening defining a post pass-through bore;
    a male threaded support post; said male threaded post being receivable in said female threaded aperture; a threaded collar on said male threaded post;
    a circular wall downwardly depending from said concave inner side of said main body; said circular wall having an inner wall surface and being located to surround said wire hanger receiving slot and dimensioned to have a diameter slightly larger than a diameter of a top cap, having an outer peripheral surface, of said bird feeder; said circular wall being positionable about the top cap of a bird feeder with the inner wall surface of the circular wall being in communication with the outer peripheral surface of the top cap;
    at least one base key positioned on said lower side of said base;
    at least one main body key positioned on said main body; said at least one base key being complementary to and matable with said at least one main body key thereby fixing rotation of said guard when connected to the lower side of said base as a baffle; and
    whereby said guard may be readily placed over and installed on a bird feeder by inserting said wire hanger of said bird feeder through said wire hanger receiving slot with the concave inner side of said main body resting on the upper surface of the top cap of the bird feeder to retrofit a guard thereto; and whereby said guard may alternatively be readily secured to said base of the bird feeder as a baffle by routing said male threaded post through said post pass-through bore an into threaded engagement with said female threaded apertures of said base with said threaded collar retaining said guard in communication with said base of said bird feeder.

6. The guard of claim 5, further comprising:
    at least one base key positioned on said lower side of said base;
    at least one main body key positioned on said main body; said at least one base key being complementary to and matable with said at least one main body key thereby fixing rotation of said guard when connected to the lower side of said base as a baffle.

7. The protective guard of claim 5, wherein said main body and said circular wall are manufactured of plastic.

8. The protective guard of claim 5, wherein said main body is transparent.

* * * * *